Patented Oct. 9, 1945

2,386,517

UNITED STATES PATENT OFFICE 2,386,517

HYDROXY-SUBSTITUTED ARYL GUANAMINES

Jack Theo Thurston, Cos Cob, Conn., assignor to American Cyanamid Company, New York, N. Y., a corporation of Maine No Drawing. Application August 30, 1941, Serial No. 409,140

4 Claims. (Cl. 260—249.5)

This invention relates to hydroxy-substituted aryl guanamines and methods of making them.

Several unsubstituted aryl guanamines have been made by rather laborious processes and in low yields, such as for example, benzo-guanamine. These guanamines, however, are restricted in their field of utility because, when used for making resins by condensation with formaldehyde, the resins are colorless and hence have to compete with numerous other amino plastics, some of which are available at much lower prices. The hydroxy aryl guanamines, however, have important additional properties in that, in most cases, the hydroxy group renders the aromatic portion of the guanamine capable of coupling with diazo compounds to form azo dyes in which the guanamine is a portion of the dye molecule. When such dyes are combined with formaldehyde to form resins, the resin itself is colored and requires no additional color. Very desirable colored plastics and films can thus be produced, and this is an important new field which is open to the products of the present invention. It should be understood, however, that while the production of colored resins forms an important field of utility for the hydroxy-substituted aryl guanamines of the present invention, it is not the only use, and the invention is in no sense limited to any single use.

The products of the present invention are new compounds, and the invention is not broadly limited to any particular process of making them. It is an advantage that any of the usual processes can be employed. However, in a more restricted aspect, I prefer to prepare the compounds by the reaction of an ester of the corresponding hydroxy mono-nuclear aryl carboxylic acid with a biguanide. This process is particularly useful and it is an advantage of the present invention that many of the hydroxy aryl guanamines can be prepared without the need of any special condensing agents. In some cases condensing agents such as metal alkoxides may be employed to accelerate the reaction, or to obviate salt formation with the biguanide in the case of hydroxy substituted aryl esters which also have other strongly negative substituents.

In the preferred process described above, the particular alcoholic radical in the ester is not of vital importance, and broadly, any ester may be employed. In general, however, I find that the esters of the low molecular monohydric paraffin alcohols give excellent results and are ordinarily cheap and easy to prepare. Other esters, however, such as the esters of ether alcohols of the ethylene glycol ether type and the phenolic type may also be employed.

It is desirable to carry out the process of preparing the hydroxy aryl guanamines of the present invention in the presence of an organic solvent or diluent. Any suitable solvent may be used, but I have found that the best results have been obtained with alcohols as solvents. Here again, any alcohol may be used which has adequate solvent action for the biguanide in question. In general, the lower monohydric paraffin alcohols such as methanol and ethanol are effective as are the lower molecular ether alcohols such as the ethyl ether of ethylene glycol. While in no sense essential, it is convenient to use an alcohol as a solvent corresponding to the alcohol radical of the ester used, because in the reaction the alcohol is formed and when the two are the same, no separation problem is involved.

The most important hydroxy-substituted aromatic guanamines of the present invention are those prepared with biguanide in which case the triazine ring is substituted by two amino groups. However, the invention is not limited to such guanamines; on the contrary, N-substituted guanamines may be prepared and in some cases are products of considerable practical importance. They are easily made by using the corresponding substituted biguanide, such as phenyl biguanide, allyl biguanide, and the like, although the reaction is often not as rapid as with biguanide itself, and it is frequently desirable to use a condensing agent such as a metal alkoxide. It should be noted that the use of a condensing agent such as a metal alkoxide is not claimed broadly in this case, but only in conjunction with the preparation of hydroxy-substituted aryl guanamines to which the present case primarily relates.

*Example 1*

2-hydroxybenzoguanamine

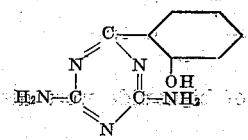

One hundred and thirty-one parts of biguanide were dissolved in 400 parts of methanol. Thereupon 228 parts of methyl salicylate were added and the solution filtered. After standing overnight the guanamine had precipitated and was removed by filtration. On further standing, the filtrate deposited more guanamine, which was combined with the main product and was further purified by dissolving in the ethyl ether of ethylene glycol and precipitated by dilution with water. The product was in the form of small light yellow crystals having a melting point of 267° C., the yield varying from about 54 to about 58%.

Example 2
2-hydroxy-3-nitrobenzoguanamine

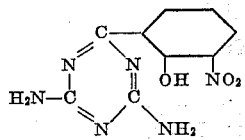

20.2 parts of biguanide were dissolved in 120 parts of methanol and the solution was filtered. 42 parts of methyl nitrosalicylate dissolved in about 175 parts of methanol were then added. After mixing, the solution became blood red and an orange precipitate formed which was the biguanide salt of methyl 3-nitrosalicylate. A molecular equivalent of sodium metal was dissolved in about 800 parts of methanol and added to the above biguanide salt solution forming a blood red solid. This reaction mixture was stirred and refluxed for about two hours and then diluted with water, acidified with acetic acid. The precipitated product was filtered and purified by dissolving in the ethyl ether of ethylene glycol and diluting with a mixture of methanol and water. Minute yellow plates melting at 296° C. were obtained. The yield was somewhat less than 10% owing to salt formation which inhibited the production of guanamine.

Example 3
2-hydroxymethylbenzoguanamine

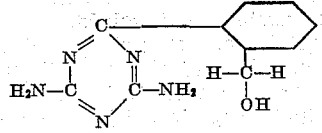

20.2 parts of biguanide were dissolved in 80 parts of methanol and to the filtered solution was added 28.2 parts of phthalide dissolved in 80 parts of methanol, together with the molecular equivalent of sodium methoxide. After standing overnight the guanamine had partially precipitated and within one-half hour after scratching the sides of the reaction flask, there was a voluminous precipitate. The product was recrystallized from water containing a small amount of ammonia and the plate-like needles melted at 218° C., the yield being just under 45%.

Example 4
2-hydroxycinnamoguanamine

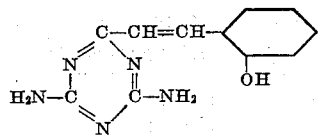

21.2 parts of biguanide were dissolved in 100 parts of methyl alcohol, the solution was filtered and then a solution of 29.2 parts of coumarin dissolved in 80 parts of methyl alcohol were added. Reaction took place slowly and was speeded by the addition of a small amount of sodium methoxide. The solution was acidified with acetic acid and evaporated, giving a yellow solid which was boiled with water, filtered, and finally dissolved in the ethyl ether of ethylene glycol. On dilution with an equal volume of naphtha, fine light yellow needles, melting at 296° C., were precipitated. The yield was about 15%.

Example 5
4-hydroxy-3-sulfobenzoguanamine

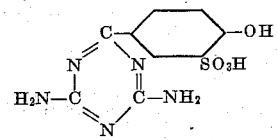

Thirty parts of biguanide were added to 42 parts of the potassium salt of methyl 3-sulfo-4-hydroxybenzoate dissolved in about 750 parts of methanol. After standing for some time the reaction product did not precipitate from the solution. Uncombined biguanide was precipitated by adding an excess of a copper sulfate solution and filtering, in order to remove the insoluble biguanide copper sulfate salt. The filtrate was then freed of copper by means of hydrogen sulfide followed by filtration, and the filtrate concentrated to a viscous mass under reduced pressure. The excess sulfuric acid was removed by digestion with 200 parts of ethanol, leaving a colorless solid, which on recrystallization from water gave colorless plates melting at about 326° C., the yield being about 10%. As in the preceding example, the yield is adversely affected by salt formation.

What I claim is:
1. A method of preparing a hydroxy-substituted aryl guanamine which comprises the steps of dissolving a biguanide in a suitable solvent therefor, adding thereto an ester of a hydroxy-substituted mono-nuclear aromatic carboxylic acid, carrying the resultant reaction to substantial equilibrium and isolating the resultant hydroxy-substituted aryl guanamine.

2. A method of preparing a hydroxy-substituted aryl guanamine which comprises the steps of dissolving biguanide in a suitable solvent therefor, adding thereto an ester of a hydroxy-substituted mono-nuclear aromatic carboxylic acid, carrying the resultant reaction to substantial equilibrium and isolating the resultant hydroxy-substituted aryl guanamine.

3. A method according to claim 1 in which the reaction is carried out in the presence of a lower monohydric paraffin alcohol as a solvent.

4. A method according to claim 2 in which the reaction is carried out in the presence of a lower monohydric paraffin alcohol as a solvent.

JACK THEO THURSTON.